J. R. RANDALL.
Corn Planter.
No. 86,589. Patented Feb. 2, 1869.
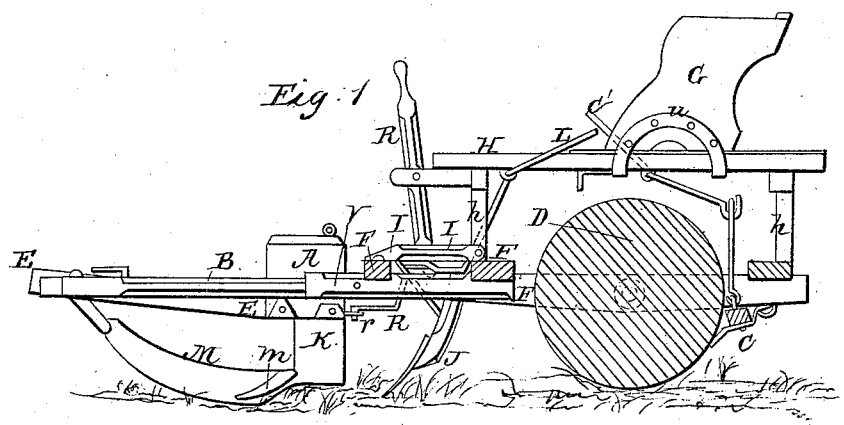
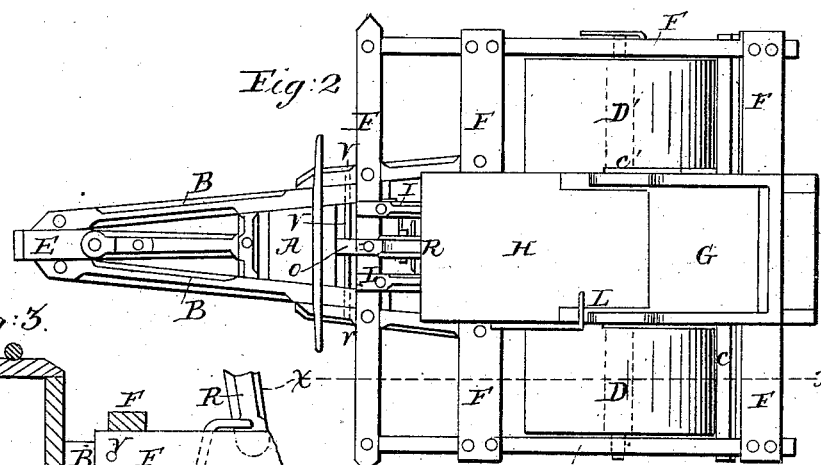
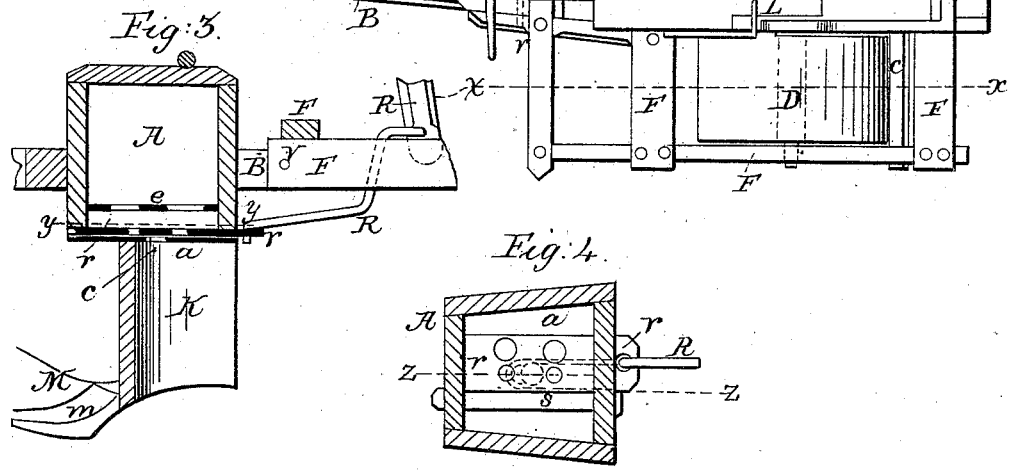

United States Patent Office.

JACOB R. RANDALL, OF CAMARGO, ILLINOIS.

Letters Patent No. 86,589, dated February 2, 1869.

IMPROVEMENT IN CORN-PLANTERS.

The Schedule referred to in these Letters Patent and making part of the same.

*To all whom it may concern:*

Be it known that I, JACOB R. RANDALL, of Camargo, in the county of Douglas, and State of Illinois, have invented a new and improved Corn-Planter; and I do hereby declare that the following is a full, clear, and exact description of the construction and operation of the same, reference being had to the accompanying drawings, making a part of this specification, in which—

Figure 1 is a longitudinal vertical section through line $x\,x$ of fig. 2;

Figure 2 is a top view;

Figure 3 is a vertical section through the seed-box; and

Figure 4 is a horizontal section through line $y\,y$ of fig. 3.

In this invention, the corn-planter is so improved in construction, that it can be turned more easily, and the action of its plows, seeding-apparatus, &c., can be more readily and conveniently controlled, than heretofore.

In the drawings—

F is the main frame of the machine.

E, the draught-pole.

D D', the two rollers that level the ground after the corn has been planted and covered.

H, a platform above the rollers, supported upon four standards, $h\,h\,h\,h$, and itself supporting the driver's seat G.

C, a scraper, hung by hinges to the frame F, behind the rollers, and operated by means of a lever, C', at the right side of the seat.

J J, two covering-plows, firmly attached to a frame, I, which is hinged, at its rear end, to the frame F, and is provided with a lever or treadle, L, by which its forward end can be lifted so as to raise the plows out of the ground.

A is the seed-box, supported between two braces, B B, that run from the frame F forward to the sides of the draught-pole.

K is the boot, or seed-conductor, extending down from the bottom of a seed-box, and M is a curved cutter, attached, at its rear end, to the lower end of the conductor K, and at its upper or forward end, to the draught-pole, and provided with two inclined wings or mould-boards, $m\,m$.

The conductor is composed of metal, and is wide from front to rear, narrow from side to side, and sharp, or wedge-form, on its front edge, so that it answers as an opening-plow, as well as seed-conductor.

The cutter M first enters the soil, marking the course of the furrow, and, on plowed land, throwing out some of the dirt, by means of its wings $m\,m$. The conductor then opens the furrow and drops the seed, and as soon as it has passed along, the two plows J J cover the seed, and the rollers level off the dirt.

The scrapers may be used, when occasion requires, for cleaning the rollers.

In land not plowed, the cutter will sever the sod, and the wings $m\,m$ will run under it and lift it on each side, while the conductor conveys the seed. The sod will then drop back to its place, and will be pressed down by the rollers, the two covering-plows being raised out of the way, or entirely removed during the operation.

The seed-box is provided with a perforated removable false bottom, $e$, which mainly sustains the weight of the seed and the box.

Below this is the permanent bottom $a$, provided with an opening or openings, $c$, for the passage of the seed to the conductor.

An adjustable reciprocating perforated slide, $r$, works back and forth over the opening $c$, being operated by a lever, R, near the driver's seat.

A key, $s$, alongside of the slide, serves to regulate the position of the latter with relation to the openings below it, and thus to control the feed, since, by inserting the key on one side or the other of the slide, the passages are more or less closed, at pleasure.

For convenience in turning the instrument at the ends of the furrows, the seat G is made to slide back and forth on the platform H, bringing the weight of the driver forward or behind the rollers, so as, in the one case, to depress the forward end of the machine, and in the other, to raise it from the ground. Upon arriving at the end of a row, the driver slides his seat back and raises the forward end of the machine, where it turns easily upon the rollers. He then replaces the seat, and drives on, as before.

Two curved plates, $u\,u$, attached to the sides of the seat, and having their projecting lower ends bent in under the platform, constitute the means by which the seat is retained in place on the platform and yet rendered capable of adjustment, as above described.

The whole apparatus is simple, strong, and durable, and can easily be operated by one man. It has been thoroughly tested both in plowed and unplowed land, and is found to be as admirably adapted for use in the one as in the other.

In planting on plowed land, the surface of the row is left level and smooth, so that the sun will warm the ground; and a furrow, to drain off the water, is left on either side of the row.

The corn is always placed in the ground at a uniform depth, and the operation of the machine is such as to effectually clean the ground and give the young corn, at its start, a fair chance with the weeds and grass.

It also mellows the ground thoroughly, so that the next plowing is rendered easy and effective.

When not used for seeding, the parts E B, A K, and M, may be removed by taking out the bolt $v$, and then the apparatus may be employed with the plows J J and rollers alone, being drawn by a pole or chain attached to a plate, $o$.

Having thus described my invention,

What I claim as new, and desire to secure by Letters Patent, is—

1. The combined machine herein described, consisting essentially of the frames B F, platform H, sliding seat G, cutter M, with wings m m, conductor K, seed-box A, plows J J, attached to the tilting frame I, levers R L, and rollers D D, all constructed, arranged, and operating in the manner and for the purpose specified.

2. The arrangement of the false bottom e, bottom a, slide r, and key s, the bottoms and slide being perforated so as to act in the manner described.

JACOB R. RANDALL.

Witnesses:
A. A. RANDALL,
CORNELIUS × MEACKEUNLER.
his mark.